J. T. TYLER.
SHOVEL.
No. 188,831.        Patented March 27, 1877.
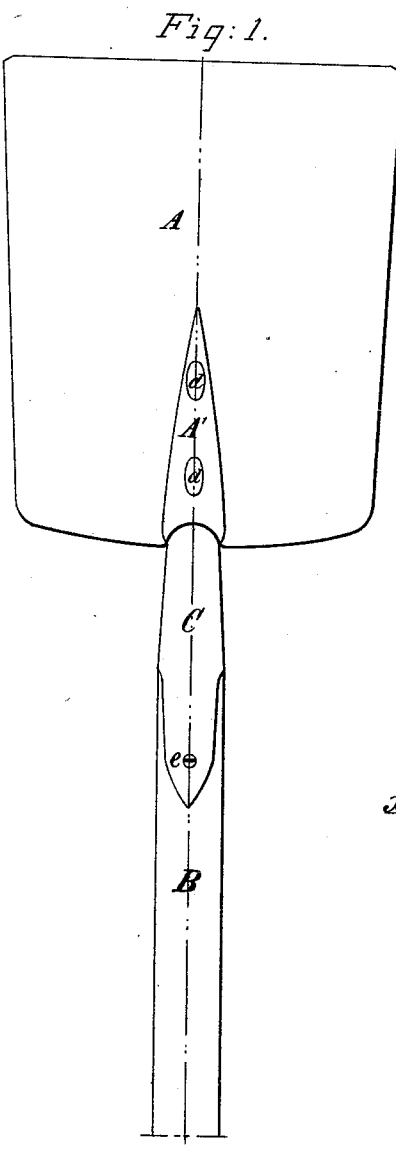
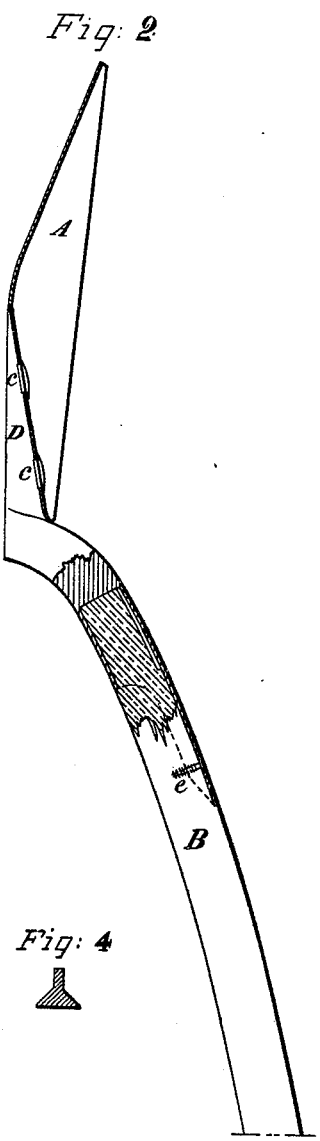
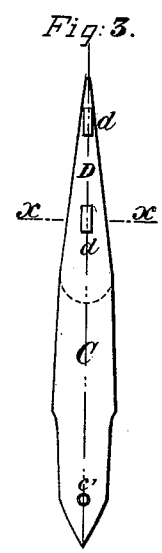
WITNESSES:
J. H. Stevenson
Sebastian Stutz
INVENTOR:
John T Tyler

UNITED STATES PATENT OFFICE.

JOHN T. TYLER, OF PITTSBURG, PENNSYLVANIA.

IMPROVEMENT IN SHOVELS.

Specification forming part of Letters Patent No. 188,831, dated March 27, 1877; application filed February 3, 1877.

*To all whom it may concern:*

Be it known that I, JOHN T. TYLER, of the city of Pittsburg, Pennsylvania, have invented a new and useful Improvement in Shovels, which improvement is fully set forth in the following specification, reference being had to the accompanying drawing.

Similar letters of reference indicate corresponding parts.

In the accompanying drawing, Figure 1 shows a top view of a common shovel with my invention. Fig. 2 is a longitudinal section of my handle-socket and bayonet-rib for attachment to the shovel-blade. Fig. 3 shows a top view of the handle-socket and bayonet-rib, and Fig. 4 a sectional view of the rivet for fastening the handle-socket and rib to the shovel-blade.

A represents a common shovel-blade. A' is a raised ridge of bayonet shape, being thus formed by a correspondingly-shaped groove on the reverse side of the blade. B is a shovel-handle. C is the handle-socket, being so formed as to admit within the same an adequate handle for the shovel A. $c$ $c$ are holes in the ridge A', for the admission of the rivets $d$ $d$ of the rib D. $c'$ is a perforation in the socket C, for securing the handle of the shovel by means of the screw $e$.

The socket C and rib D are made of one piece, being solid at the junction of the socket part with the rib part, and in this way great strength is given to that part of a shovel—a point where strength is mostly required. The rib, rivets, and socket are made of malleable or wrought iron. The rib D in its form is made to fit closely within the groove of the blade formed by the raised ridge A' of the blade. When the rib D is thus placed the rivets $d$ $d$ are made to pass up through the holes (of the blade) $c$ $c$ a sufficient distance above the rib A' to permit of their being tightly riveted; and in this manner the rib D is firmly fixed to the blade of the shovel.

In the drawing the rivets $d$ $d$ are shown to be fixed to the rib D; but I do not confine myself to this. I can secure the rib to the blade of a shovel by adjustable rivets passing up through the rib and blade, and secured in like manner as the ones represented in the drawing.

My invention being applicable to spades, scoops, and shovels alike, I do not confine the same to shovels merely.

Having thus described my invention, what I claim, and desire to secure by Letters Patent, is—

1. A shovel-handle socket, C, having the bayonet-rib D, rivets $d$ $d$, all substantially as described and shown, and for the purpose set forth.

2. The shovel-handle socket C, having the rib D and rivets $d$ $d$, combined with a shovel-blade having a bayonet-shaped groove, substantially as described and shown, and as and for the purpose set forth.

JOHN T. TYLER.

Witnesses:
JOHN H. STEVENSON,
E. H. FISHER.